US010009846B2

(12) United States Patent
Ahmadzadeh et al.

(10) Patent No.: US 10,009,846 B2
(45) Date of Patent: Jun. 26, 2018

(54) LOW-POWER LOCATION INFORMATION REPORTING

(71) Applicant: QUALCOMM Incorporated, San Diego, CA (US)

(72) Inventors: Seyed Ali Ahmadzadeh, San Diego, CA (US); Aziz Gholmieh, San Diego, CA (US); Kiran Patil, San Diego, CA (US); Venkata Sampath Kumar Mummadi, San Diego, CA (US); Vijay Venkataraman, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 81 days.

(21) Appl. No.: 14/860,634

(22) Filed: Sep. 21, 2015

(65) Prior Publication Data

US 2016/0088564 A1    Mar. 24, 2016

Related U.S. Application Data

(60) Provisional application No. 62/053,596, filed on Sep. 22, 2014.

(51) Int. Cl.
    *H04W 52/02* (2009.01)
    *H04W 4/02* (2018.01)
(52) U.S. Cl.
    CPC ......... *H04W 52/0254* (2013.01); *H04W 4/02* (2013.01); *H04W 52/0229* (2013.01); *H04W 52/0251* (2013.01); *H04W 52/0261* (2013.01); *Y02B 60/50* (2013.01)
(58) Field of Classification Search
    CPC ............... H04W 52/0254; H04W 4/02; H04W 52/0229; H04W 52/0251; H04W 52/0261

USPC ............................................. 455/456.1–457
See application file for complete search history.

(56) References Cited

U.S. PATENT DOCUMENTS

| | | | |
|---|---|---|---|
| 7,359,713 | B1 | 4/2008 | Tiwari |
| 8,948,781 | B2 | 2/2015 | Wang et al. |
| 2009/0192709 | A1* | 7/2009 | Yonker ................. G01C 21/20 701/470 |
| 2011/0215966 | A1 | 9/2011 | Kim et al. |
| 2012/0013504 | A1 | 1/2012 | Raento et al. |
| 2013/0059606 | A1* | 3/2013 | Pujol .................... H04W 4/023 455/456.3 |
| 2013/0059609 | A1* | 3/2013 | Raento ............. H04M 1/72572 455/456.6 |

(Continued)

OTHER PUBLICATIONS

Barbeau S., et al., "Dynamic Management of Real-Time Location Data on GPS-Enabled Mobile Phones," The Second International Conference on Mobile Ubiquitous Computing, Systems, Services and Technologies (UBICOMM '08), 2008, pp. 343-348.

(Continued)

*Primary Examiner* — Marisol Figueroa
(74) *Attorney, Agent, or Firm* — Patterson & Sheridan, L.L.P.

(57) ABSTRACT

Aspects of the present disclosure provide a method for wireless communications that may be performed (e.g., by a user equipment) for location information reporting. The method generally includes determining one or more properties of the UE and adjusting one or more parameters of location information reporting based on the determined one or more properties.

24 Claims, 9 Drawing Sheets

(56) References Cited

U.S. PATENT DOCUMENTS

| | | | | |
|---|---|---|---|---|
| 2013/0244696 A1* | 9/2013 | Schmidt | ............ | H04W 4/02 |
| | | | | 455/456.2 |
| 2014/0128021 A1 | 5/2014 | Walker et al. | | |
| 2014/0179266 A1* | 6/2014 | Schultz | ............ | H04W 4/24 |
| | | | | 455/406 |
| 2014/0221020 A1* | 8/2014 | Xie | ............ | G01C 22/00 |
| | | | | 455/456.3 |
| 2015/0230048 A1* | 8/2015 | Parameshwaran | ...... | H04W 4/02 |
| | | | | 455/456.1 |

OTHER PUBLICATIONS

International Search Report and Written Opinion—PCT/US2015/051377—ISA/EPO—dated Nov. 30, 2015.

* cited by examiner

LOW-POWER LOCATION INFORMATION REPORTING

CROSS-REFERENCE TO RELATED APPLICATIONS

This application claims benefit of U.S. Provisional Patent Application Ser. No. 62/053,596, entitled "LOW-POWER LOCATION INFORMATION REPORTING," filed Sep. 22, 2014 and assigned to the assignee hereof, which is herein incorporated by reference in its entirety.

BACKGROUND

Field

Aspects of the present disclosure relate generally to wireless communication systems, and more particularly, to techniques for reporting location information.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In some cases, information regarding a geographic location of a UE (referred to as, e.g., location information, position information, geographical location information, geo-location information, etc.) may be used in a variety of services and applications. Associating collected information with geographical location information, known as, e.g., geo-location tagging or geotagging, may be used to enhance the value of collected data. Location information that may be used in geo-location tagging may be gathered through a variety of sources.

In some cases, a UE may determine and report location information regularly even if the UE need not do so (e.g., where the UE is substantially stationary). Such information reporting may result in unnecessary power consumption and reduce battery life.

SUMMARY

Techniques for low power location information reporting by a UE are described herein.

Aspects of the present disclosure provide a method, performed by a user equipment, for enabling low power location information reporting. The method generally includes determining one or more properties of the UE, and adjusting one or more parameters of location information reporting based on the determined one or more properties of the UE. Aspects of the present disclosure provide an apparatus for wireless communications by a UE. The apparatus generally includes at least one processor configured to determine one or more properties of the UE and adjust one or more parameters of location information reporting based on the determined one or more properties of the UE, and a memory coupled to the at least one processor. Aspects of the present disclosure provide an apparatus for wireless communications by a UE. The apparatus generally includes means for determining one or more properties of the UE and means for adjusting one or more parameters of location information reporting based on the determined one or more properties of the UE. Aspects of the present disclosure provide a computer-readable medium for wireless communications by a UE. The computer-readable medium generally includes code which when executed by at least one processor, causes the UE to determine one or more properties of the UE and adjust one or more parameters of location information reporting based on the determined one or more properties of the UE.

Aspects of the present disclosure also provide various other methods, apparatuses and computer readable mediums.

Various aspects and features of the disclosure are described in further detail below.

DETAILED DESCRIPTION

Aspects of the present disclosure provide various techniques for reporting location information by a UE. In some cases, how (or if) a device reports location information (e.g., obtained via a satellite positioning system (SPS), such as global navigation satellite system (GNSS), GPS, GLONASS, Beidou, etc.) may be controlled to avoid unnecessary power consumption when appropriate. For example, a UE operating using its battery may report location information less frequently or with less accuracy than when the UE is plugged into external power (charging). Similarly, a UE that is stationary or moving slowly may also report less frequently or accurately than when it is moving faster.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are newer releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). For simplicity, "LTE" refers to both LTE and LTE-A. The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
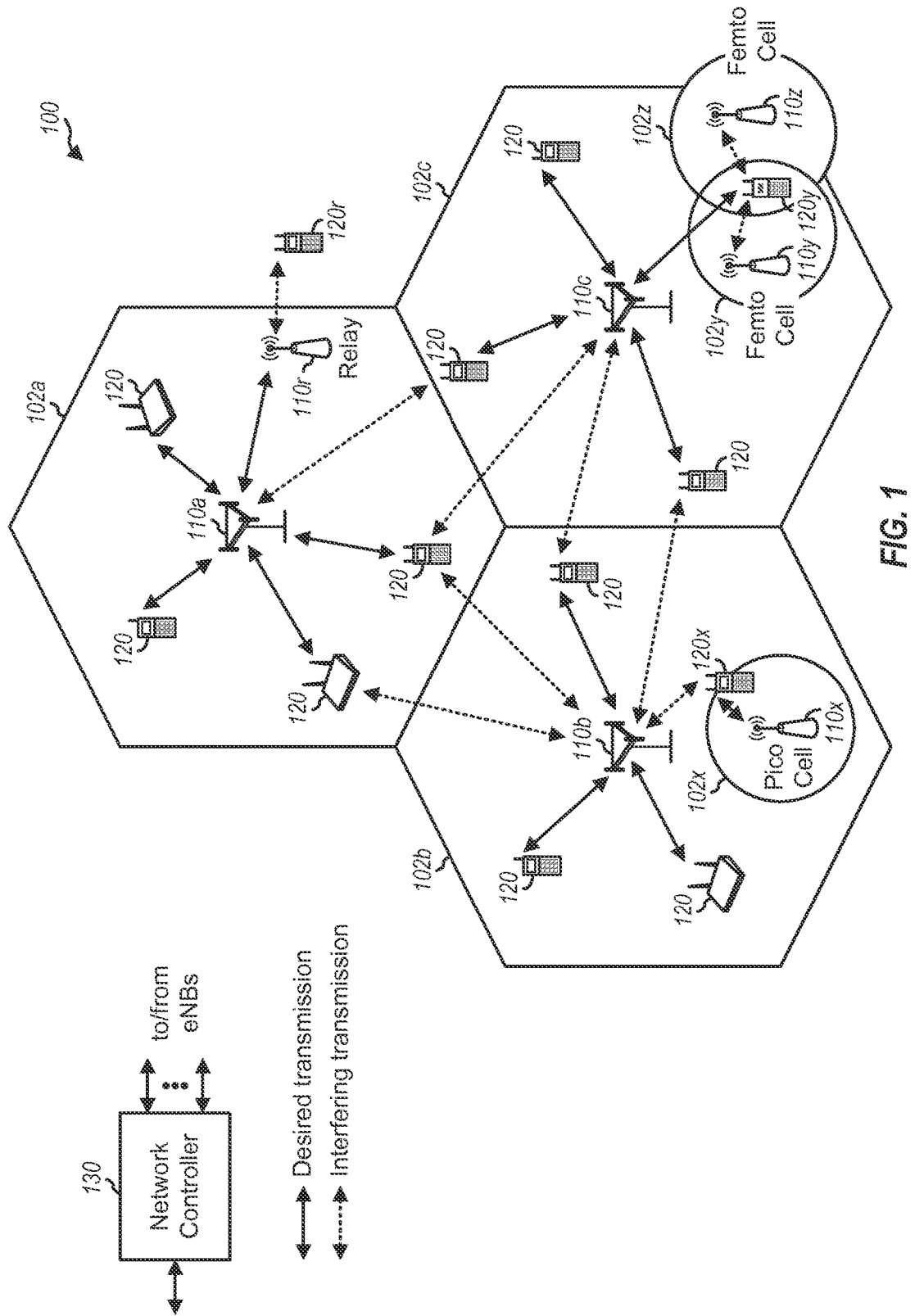
FIG. 1 is a block diagram conceptually illustrating an example of a telecommunications system, in accordance with certain aspects of the present disclosure.

FIG. 1 shows a wireless communication network 100 in which aspects of the present disclosure may be practiced. For example, UEs 120 may report location information utilizing various techniques described herein.

In some cases, the network 100 may be an LTE network including a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types. e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, an ultrabook, a camera, a gaming device, a robot, a drone, a monitor, a sensor, a meter, a wearable device (e.g., smart watch, smart glasses, smart clothing, smart wristband, smart ring, smart bracelet), and etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (6 resource blocks), and there may be 1, 2, 4, 8 or 16 subbands for system bandwidth of 1.25, 2.5, 5, 10 or 20 MHz, respectively.

Figure 2:
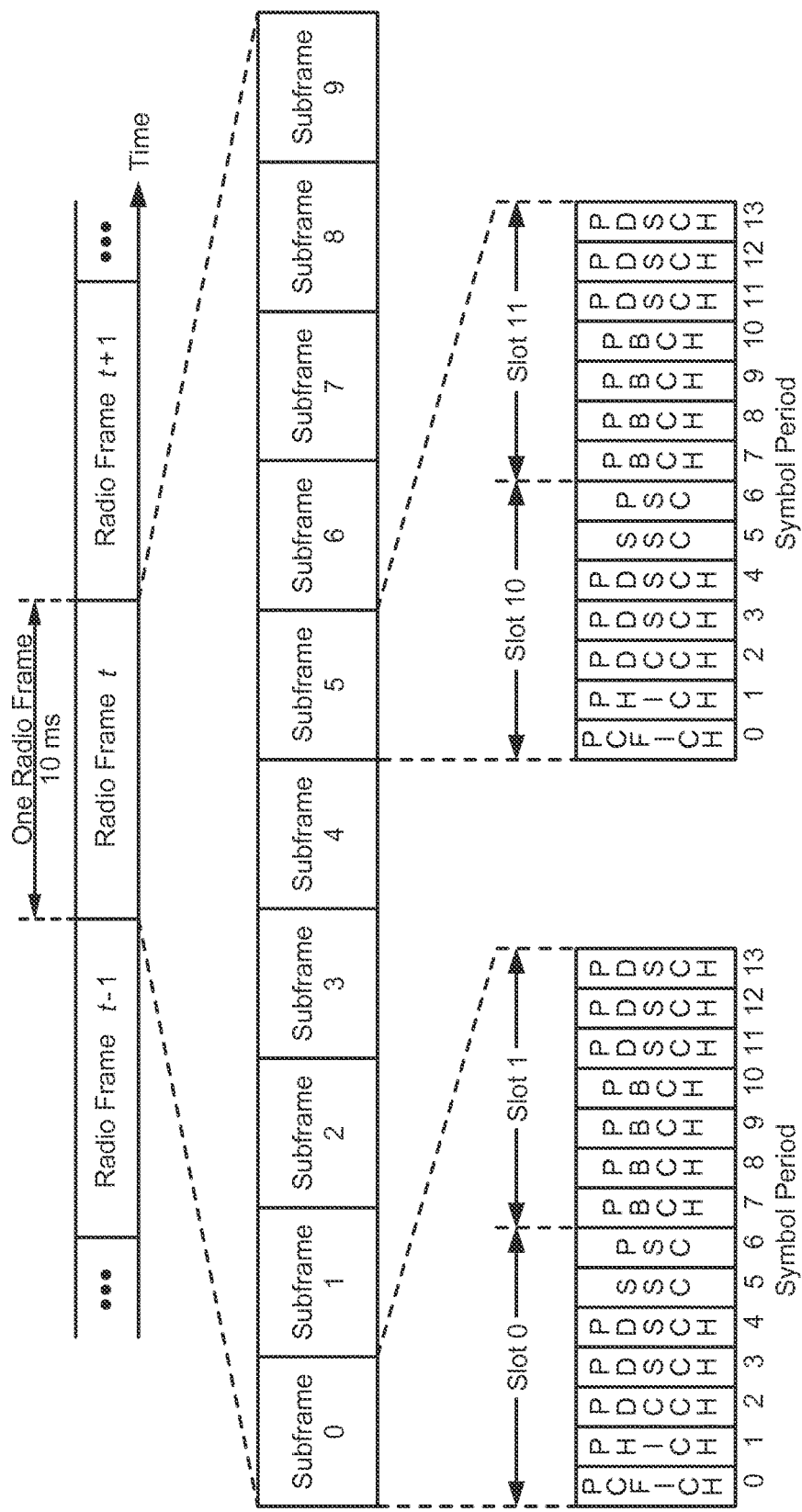
FIG. 2 is a block diagram conceptually illustrating an example of a down link frame structure in a telecommunications system, in accordance with certain aspects of the present disclosure.

FIG. 2 shows a down link frame structure used in LTE, in accordance with certain aspects of the present disclosure. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of sub-frame 0. The PBCH may carry certain system information.

The eNodeB may send a Physical Control Format Indicator Channel (PCFICH) in a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth. e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic repeat request (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS. SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
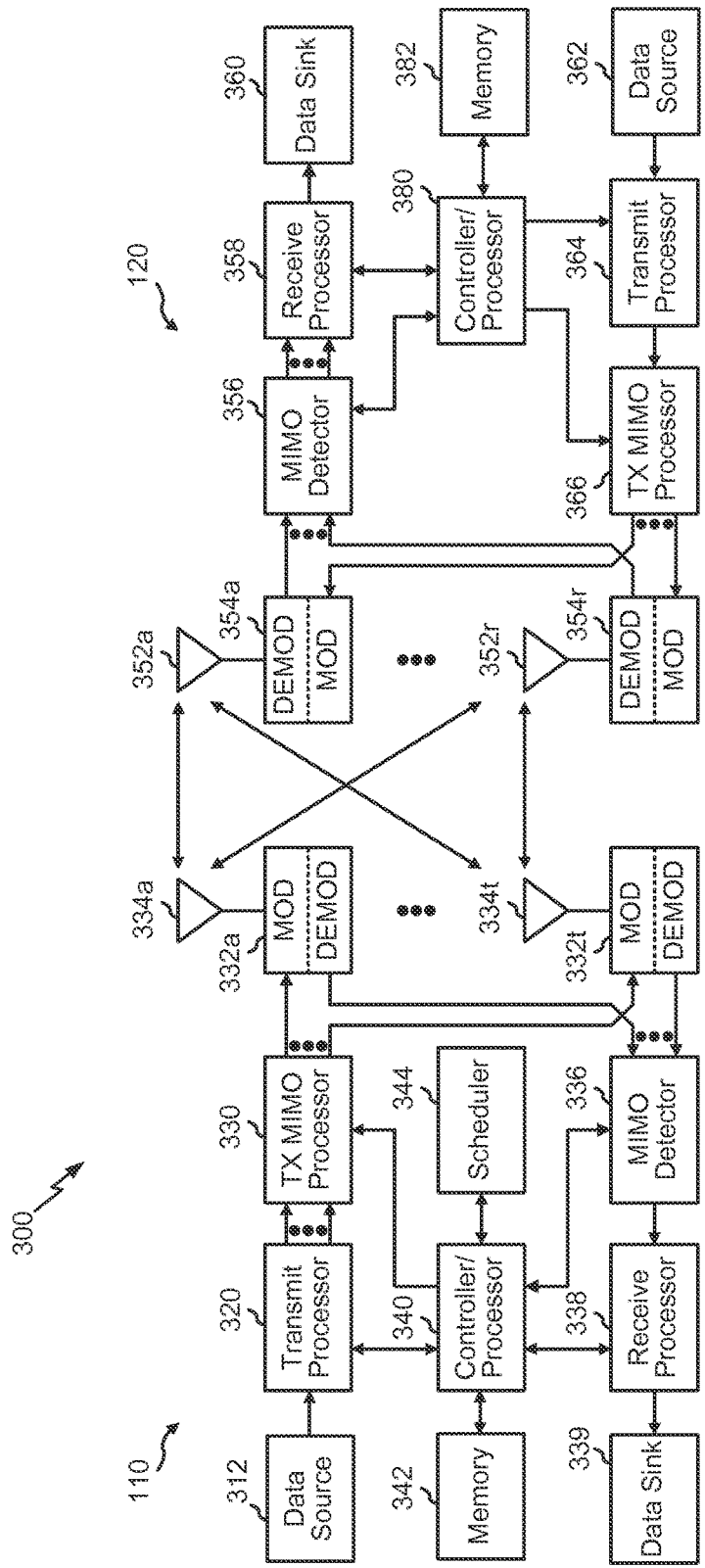
FIG. 3 is a block diagram conceptually illustrating a design of an eNodeB and a UE configured in accordance with certain aspects of the present disclosure.

FIG. 3 shows a block diagram 300 of a design of a base station/eNodeB 110 and a UE 120, which may be one of the base stations/eNodeBs and one of the UEs in FIG. 1. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH. PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the base station 110 and the UE 120, respectively. The controller/processor 340 and/or other processors, controllers, or modules at the base station 110 may perform or direct, e.g., the execution of various operations or processes for the techniques described herein. The controller/processor 380 and/or other processors, controllers, or modules at the UE 120 may also perform or direct, e.g., the execution of the operations illustrated in FIG. 6, and/or other operations or processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 includes means for determining one or more properties of the UE and means for adjusting one or more parameters of location information reporting based on the determined one or more properties of the UE. In one aspect, the aforementioned means may be the controller/processor 380, the memory 382, the receive processor 358, the transmit processor 364, or combinations thereof, configured to perform the functions recited by the aforementioned means. In another aspect, the aforementioned means may be any module or apparatus configured to perform the functions recited by the aforementioned means, e.g., modules or components of wireless device 500.

Figure 4:
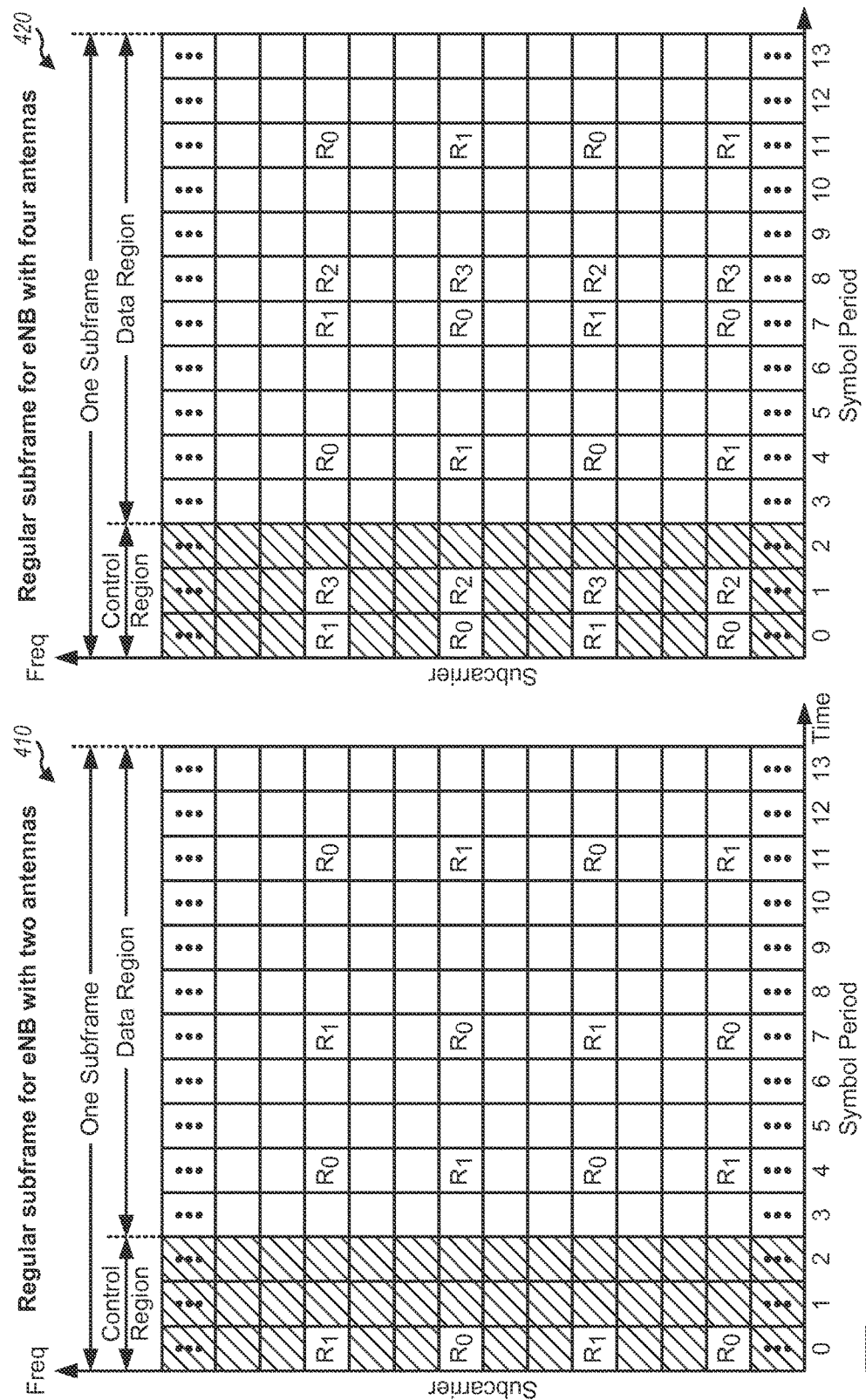
FIG. 4 illustrates an example subframe resource element mapping, in accordance with certain aspects of the present disclosure.

FIG. 4 shows two exemplary subframe formats 410 and 420 for the downlink with the normal cyclic prefix, in accordance with certain aspects of the present disclosure. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS (cell-specific reference signal) may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Figure 5:
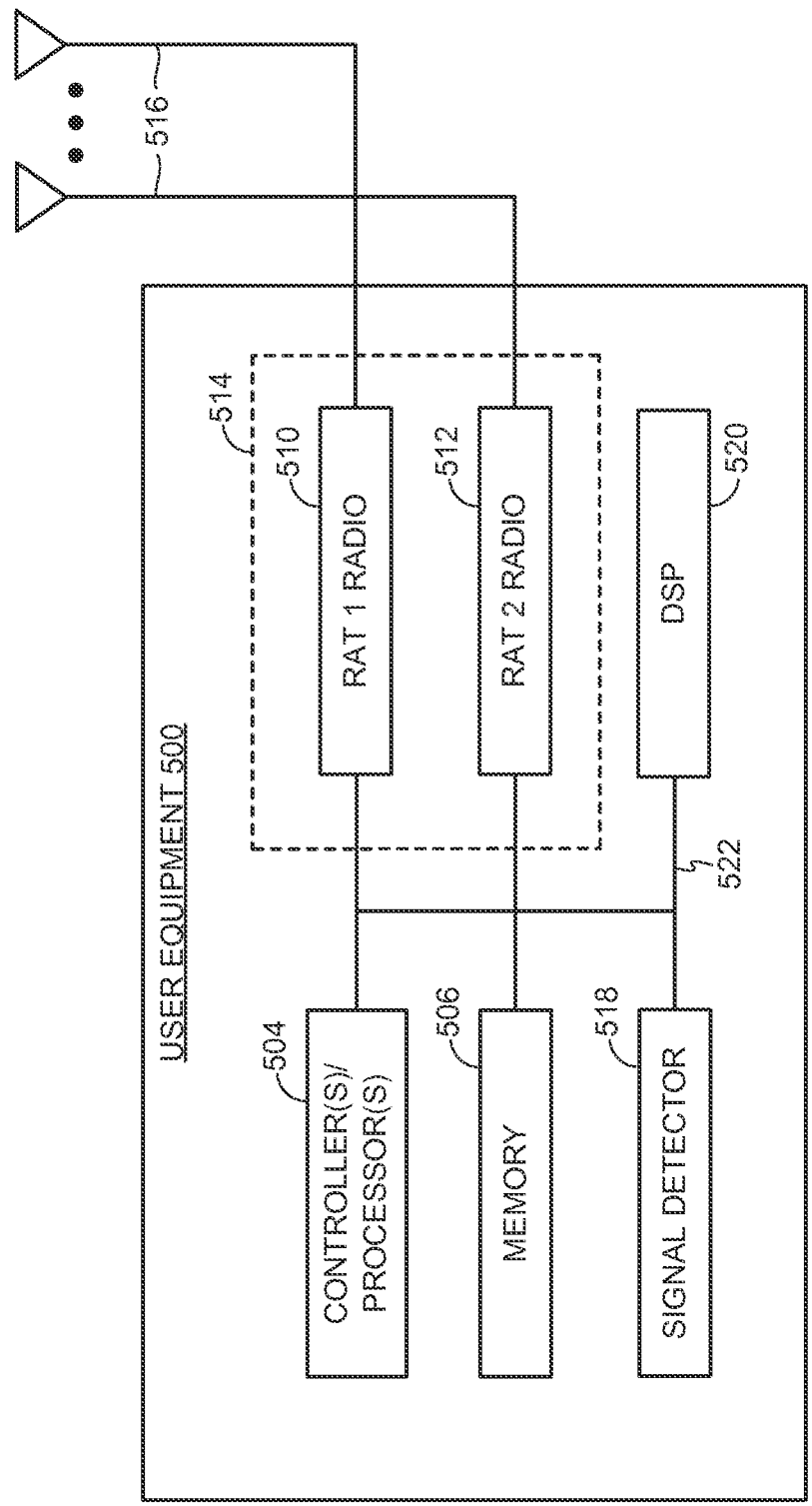
FIG. 5 illustrates a block diagram of an example user equipment, in accordance with certain aspects of the present disclosure.

FIG. 5 illustrates a block diagram of an example wireless device 500 which may perform operations to allow for location information reporting, in accordance with aspects of the present disclosure. The wireless device 500 may, for example, be one implementation of UE 120 shown in FIG. 1.

The wireless device 500 may include one or more controller(s)/processor(s) 504 which control operation of the wireless device 500. The one or more controller(s)/processor(s) 504 may perform or direct the execution of the functional blocks illustrated in FIG. 6, and/or other processes corresponding to the various techniques described herein.

The controller(s)/processor(s) 504 may also be referred to as central processing units (CPUs). Memory 506, which may include both read-only memory (ROM) and random access memory (RAM), provides instructions and data to the controller(s)/processor(s) 504. A portion of the memory 506 may also include non-volatile random access memory (NVRAM). The controller(s)/processor(s) 504 typically perform logical and arithmetic operations based on program instructions stored within the memory 506. The instructions in the memory 506 may be executable to implement the methods described herein.

As illustrated, the wireless device 500 may also include a transceiver 514 which includes a plurality of RAT (radio access technology) radios 510 and 512. In some cases, radio 510 may correspond to an LTE radio while radio 512 may correspond to a satellite positioning system (SPS) (e.g., a global navigation satellite system (GNSS)) receiver.

The wireless device 500 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 500 may also include a digital signal processor (DSP) 520 for use in processing signals and a bus 522 for coupling components of UE 500.

As noted above, aspects of the present disclosure provide techniques that may help reduce power consumption when determining and reporting location information by a user equipment (UE). As will be described in greater detail below, when and how such information is reported may depend on one or more properties of the UE.

For many applications, the provision of services and functionality may use, at least in part, geographical location. Such applications may use geo-location tagging (e.g., associating a geographical location with one or more pieces of data) to improve the accuracy of data, enhance post-processing value of the collected data, and optimize performance of a UE, the network, or both. A variety of applications and services may benefit from the use of geo-location tagged data. These applications and services may include, for example, service selection and camping, out of service and radio link failure recovery, network planning and performance analysis, and enhanced minimization of drive tests (eMDT) functionality.

To enable geo-location tagging of information by a UE, the UE may use multiple location information sources to determine the location of the UE. For example, a UE may obtain location information from a satellite positioning system (SPS), e.g., a global navigation satellite system (GNSS) (e.g., Global Positioning System (GPS), GLONASS, Galileo. Beidou, etc.), a regional satellite system, etc., using network-provided location information (e.g., from location servers or wireless local area network (WLAN)-based location information), or sensor elements (e.g., motion detectors or gyroscopes). Each device that can be used to determine the location of the UE may have a different power usage profile; for example, a SPS receiver may use a relatively high amount of power, while sensor elements may use a relatively low amount of power. Using location information sources with a high power usage may be suitable in some situations (e.g., when the UE is operating on line power or a fully-charged battery) but may not be suitable in other situations (e.g., when the UE is operating on an almost fully discharged battery).

Based on the location of the UE and available services, the UE may be able to use one or multiple sources to retrieve or determine location information. Each location information source may impose a tradeoff between power usage and reliability or accuracy of the location determination. For example, using SPS (e.g., GPS) derived location information may entail high power usage but highly accurate location information, while deriving location information from sensor elements may entail low power usage and less accuracy in determining the location of the UE.

Some services may have long running periods, which involves multiple location query requests during the operating timeline of the service. For example, in eMDT, a UE is requested by a network to transmit information related to network coverage or performance over a time period, a UE may perform a plurality of coverage or performance measurements, correlate each measurement to a location, and transmit the geo-location tagged information to the network. Determining a location for each measurement may increase the power impact on the UE, particularly if the UE determines location information using a high power usage device or method, and may affect user willingness to cooperate in activities such as data collection.

Further, in some locations, SPS location information may not be always be available or may take a large amount of time to obtain. For example, a UE located inside a building or in an area with line-of-sight obstructions (e.g., a downtown environment where the UE is surrounded by tall buildings), the UE may not be able to obtain a signal from a sufficient number of SPS satellites or may spend a long amount of time obtaining signals from a sufficient number of SPS satellites to determine the location of the UE. However, the UE may continuously request location information from a SPS receiver, which may increase power usage (and correspondingly decrease battery life). Multiple requests for information from an SPS receiver and long activity times to obtain location information from an SPS receiver increases the service power fingerprint.

Figure 6:
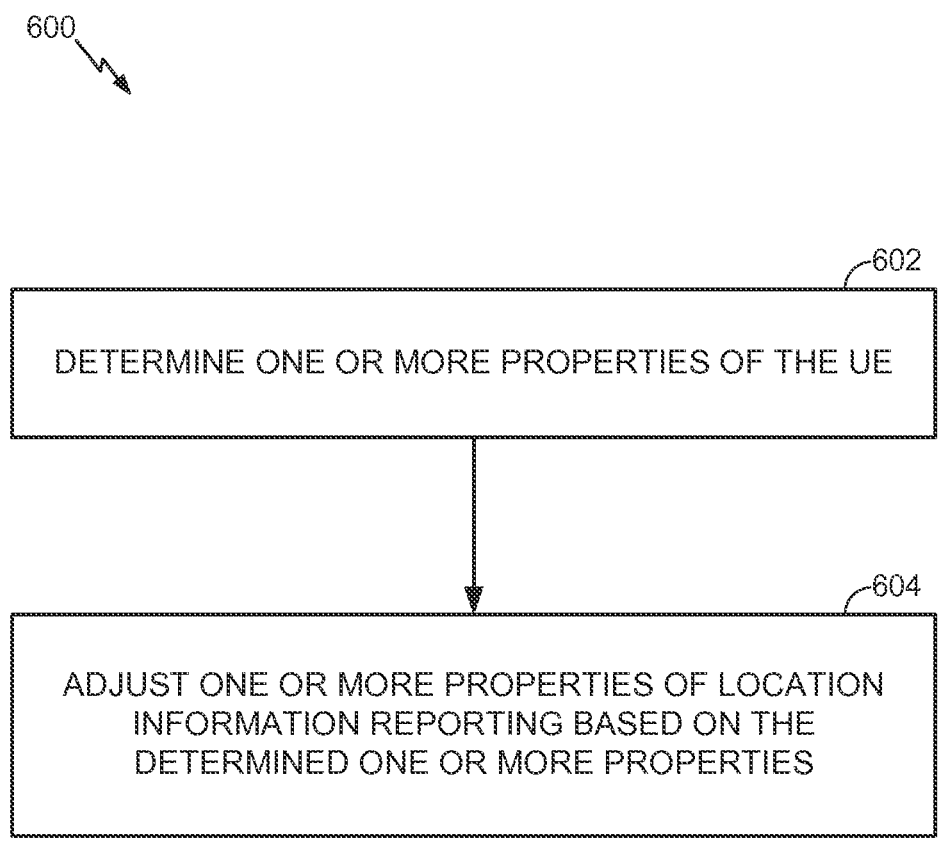
FIG. 6 illustrates example operations that may be performed by a user equipment, in accordance with certain aspects of the present disclosure.

FIG. 6 illustrates example operations 600 that may be performed by, for example, a UE in accordance with aspects of the present disclosure. Operations 600 may begin at 602, where the UE determines one or more properties of the UE. At 604, the UE adjusts one or more properties of location information reporting based on the determined one or more properties of the UE.

According to certain aspects, a UE may use available information to control the power impact of determining location information for different services. Available information may be used, for example, to determine when the UE requests updated SPS location information, when the UE can re-use information about the UE's last known location, accuracy or reliability thresholds (or constraints) on the reported location information, when to cancel a submitted location information request (e.g., if no response has been received), or when to opt-out of reporting location information, etc.

According to certain aspects, a UE may decide to when and how to gather or report location information based on a power state. For example, the UE may decide whether or not to engage a GPS (or other type of SPS device) engine to get a fix on location information, depending on available battery level, the charging status, or both. In some cases, deciding not to engage a SPS engine may include powering down the SPS engine or placing the SPS engine into a low power state. If the UE is not connected to line power and the battery level of the UE falls below the threshold, the UE may determine location information using devices with a lower power usage profile. According to certain aspects, such a determination may be further based on the last known location of the UE. For example, if the UE is located in an airport, the UE may determine that a SPS device should not be used to obtain location information even if the UE is connected to line power to conserve power, thereby increasing the amount of time the UE can be used during flight. In such a case, the UE can select other devices with a lower power usage to determine location information or determine that no location information should be reported.

According to certain aspects, a UE may control the frequency in which a service can request location information. For example, the UE may control how often a particular service may request location information from a SPS device or how often a service may request location information from one or more sensors (e.g., motion detector sensors, gyros) or from network feedback (e.g., frequency of handover from one cell to another or Doppler shift).

According to certain aspects, a property on which parameters of location information reporting may be based may be a number of times location information is requested during a service period. For example, a particular service can be limited on how many queries can be submitted during the service period.

According to certain aspects, a UE may use a data usage threshold to determine whether to use, e.g., wireless wide area network (WWAN) based location information reporting (e.g., Assisted GPS (A-GPS)) to determine location information. For example, if a UE is operating with a data usage cap or threshold, the UE may determine that WWAN-based location information may be limited (e.g., used sparingly) or disabled.

According to certain aspects, adjusting acceptable accuracy/reliability level for the location information may be performed (e.g., by a UE). According to certain aspects, a parameter of location information reporting may comprise an acceptable accuracy or reliability level for location information. Depending on the target power fingerprint, UE condition, history of the service and service parameters the UE may adjust the acceptable level of accuracy and/or reliability for the location information. An acceptable location accuracy and/or reliability level may be determined based on, for example, the type of service requesting location information, a priority metric of the requesting service, a power status of the UE (e.g., battery level and/or charging state), the number or frequency of previous location information requests, or the total or expected service time.

Parameters for location information reporting may be used separately or in a combination of any number of parameters to determine the one or more location information sources that the UE can use to determine and report location information. Conditions of a set of parameters may be used to adjust the effect of other parameters on a determination or adjustment of one or more parameters of location information reporting. For example, a high battery level condition can increase the frequency or number of allowed requests that the UE makes for SPS-based location determination and reporting. The UE can decide to rely on the previously known location rather than submitting a new request for a SPS fix. The best available location information may be updated, e.g., when other services request for SPS fix.

In some cases, a UE may postpone submitting queries for updated location information if the best available position (BAP) information satisfies a minimum accuracy and/or reliability level for a requesting service. BAP information may be set from SPS location data, and secondary sources (e.g., sensor data, wireless local area network (WLAN) based information, or network provided location information) may be used to update BAP information. When a request for location information is received, the UE can examine the BAP information for accuracy and/or reliability before determining that a SPS device is to be queried. If the BAP information has an acceptable level of accuracy and/or reliability, the UE may return BAP information in response to the request. Otherwise, the UE may determine location information using a SPS device and return the SPS location information in response to the request. If the accuracy and/or reliability of the BAP information is acceptable, the UE uses the available info. The UE may use different levels of accuracy and/or reliability for BAP as compared to the SPS (e.g., GPS, Beidou, etc.) engine location information.

Determinations of whether BAP information has an acceptable level of accuracy and/or reliability, or updating the accuracy and/or reliability of BAP information, may be based on available inputs from internal and external sources. For example, internal sources, such as motion detector sensors or gyroscopes, can be used to determine if the UE is substantially stationary or in motion. If the UE is determined to be substantially stationary, the UE can determine that the BAP information (e.g., of the last known location) can be re-used with a high degree of confidence. If the UE is in a fast moving scenario, the UE can determine that BAP information may fall below the accuracy and/or reliability threshold for re-use and may decide to opt out of collecting location information due to the high power draw imposed by repeatedly tracking the location of the UE, e.g., using devices with higher accuracy and power usage profiles (e.g., using SPS devices rather than deriving location information from BAP/sensor data). External sources, such as network feedback, may also be used to determine whether BAP information has an acceptable level of accuracy and/or reliability. Short handover periods may suggest a fast moving scenario, which may entail a rapid degradation of BAP reliability. High interference and channel fading parameters may suggest that the UE is operating in an environment in which obtaining a SPS lock entails engaging the SPS device for a large amount of time (with a correspondingly high amount of power usage), e.g., a downtown environment.

As noted above, in some cases, determining one or more properties of the UE may include determining at least one of a battery level or charging state. For example, if it is determined that a battery level exceeds a threshold or determining that a battery is charging, the adjusting one or more parameters may include enabling a SPS receiver. In some cases, determining one or more properties of the UE may also include determining a frequency of requests for location information. In some cases, determining one or more properties of the UE may include determining that the UE is currently at a previously known location. Determining one or more properties of the UE may include determining a data usage threshold. For example, if it is determined that the UE is operating under a data usage threshold, the UE can adjust a number of times location information can be requested using wireless wide area network (WWAN) data services.

Figure 7:
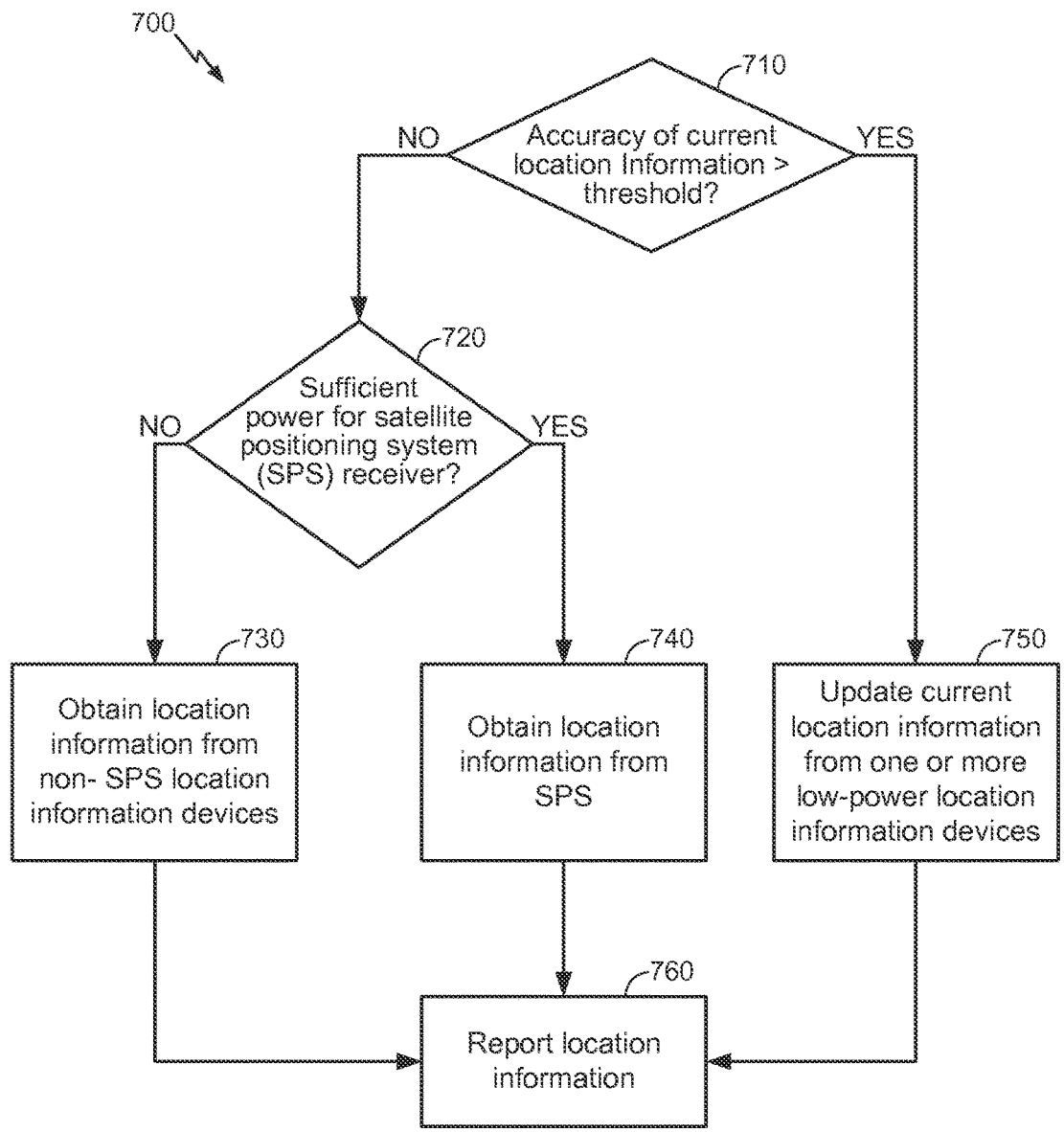
FIG. 7 illustrates a flow diagram of example operations for reporting location information, in accordance with certain aspects of the present disclosure.

FIG. 7 illustrates an example flow chart of operations 700 that may be performed to determine whether BAP information has an acceptable level of accuracy and/or reliability and update location information based on information from an SPS receiver or other location information devices, in accordance with some aspects of the present disclosure. Operations 700 begin at 710, where a UE compares the accuracy and/or reliability of the current location information to a threshold. If the accuracy and/or reliability of the current location information falls below the threshold value, operations 700 proceed to 720.

At 720, the UE determines whether or not there is sufficient power to obtain location information from a satellite positioning system (SPS) receiver. In an example, a UE may determine whether there is sufficient power to obtain location information from an SPS receiver based on a battery level threshold and/or whether the UE is connected to line power or otherwise in a charging state. If there is not sufficient power to obtain location information from an SPS receiver, operations 700 proceed to 730, where the UE obtains location information from non-SPS location information devices. For example, a UE may obtain relatively accurate location information from WWAN-based location determination (e.g., A-GPS), while using less power than an SPS receiver. Otherwise, if there is sufficient power to obtain location information from an SPS receiver, operations 700 proceed to 740, where the UE obtains location information from the SPS receiver.

If the accuracy of the current location information exceeds the threshold value, a UE need not obtain new location information from location information sources with relatively high accuracy and power consumption profiles (e.g., an SPS receiver). Thus, operations 700 proceed to 750, where the UE updates the current location information based on information gathered from one or more low-power location information devices. For example, if the accuracy of the current location information exceeds an accuracy threshold, the UE may update the current location information based on information gathered from various sensors. At 760, the UE reports location information.

Figure 8:
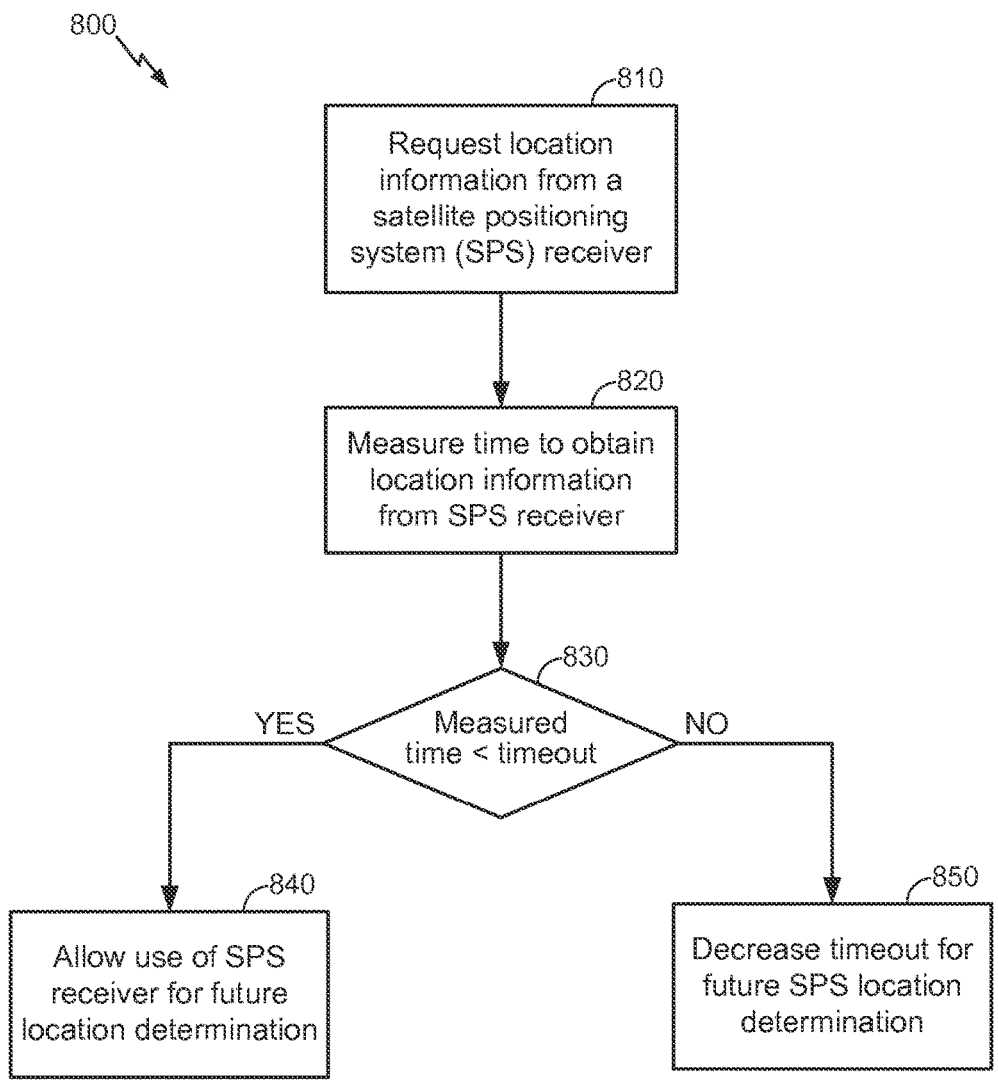
FIG. 8 illustrates a flow diagram of example operations for performing location determination using a satellite positioning system (SPS), in accordance with certain aspects of the present disclosure.

In some cases, a UE may control an amount of time during which an SPS receiver may be active to obtain location information. FIG. 8 illustrates example operations 800 that may be performed by a UE to adjust SPS receiver activity based on an amount of time elapsed between activation of an SPS receiver and obtaining location information, in accordance with some aspects of the present disclosure. Operations 800 may begin at 810, where the UE requests location information from an SPS receiver. At 820, the UE measures the time elapsed to obtain location information from the SPS receiver. In some cases, the UE may set a timeout value specifying the maximum amount of time that the SPS receiver may be active, and the measured time may be either the amount of time elapsed to obtain location information from the SPS receiver or the timeout value.

After the UE measures the time elapsed to obtain location information from the SPS receiver, operations 800 proceed to 830, where the UE compares the elapsed time to a timeout value. If the elapsed time is less than the threshold, operations 800 proceed to 840, where the UE continues to allow use of an SPS receiver for future location determination without changing the timeout value. Otherwise, operations 800 proceed to 850, where the UE sets the timeout value to a smaller amount of time for future SPS location determination. Thus, when a UE attempts to use an SPS receiver to obtain location information, the SPS receiver may operate for a reduced amount of time before reporting location information.

Figure 9:
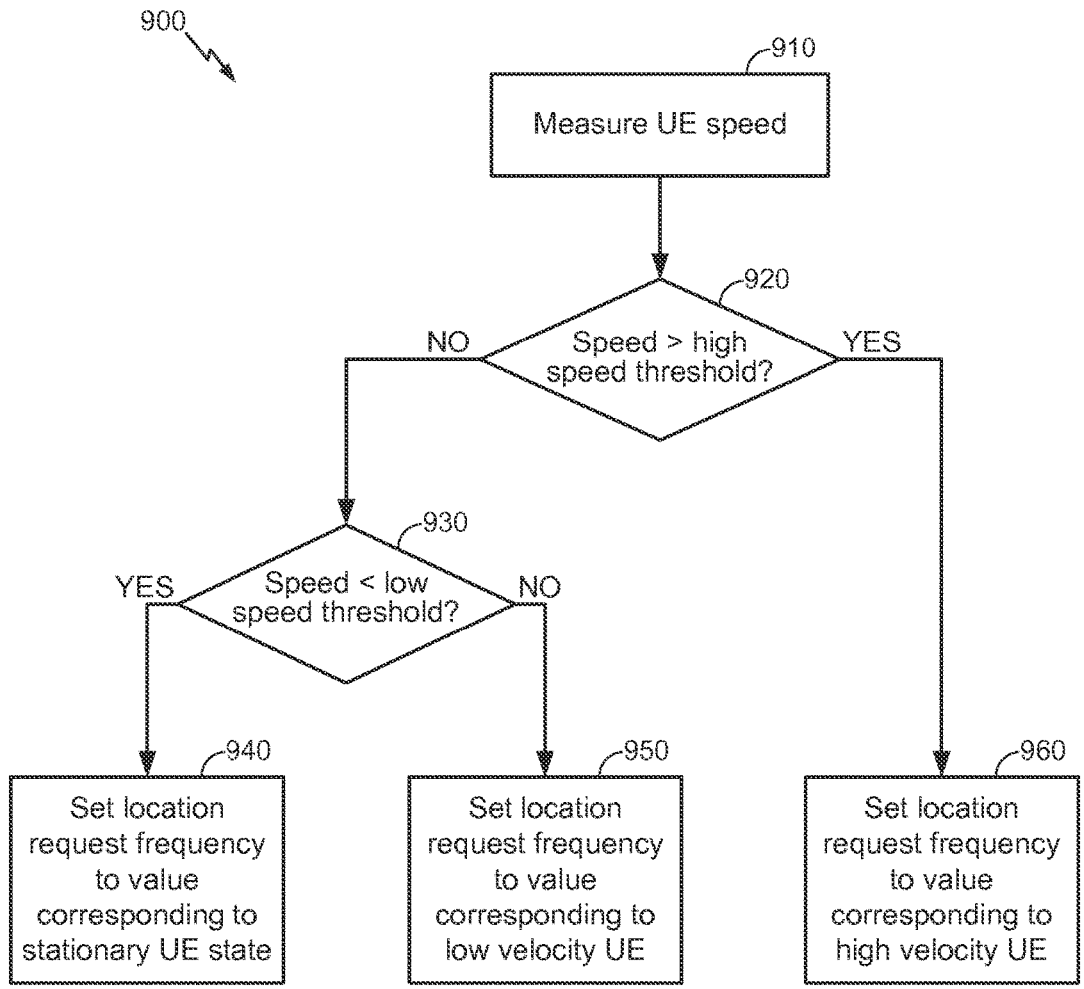
FIG. 9 illustrates a flow diagram of example operations for determining when to report location information based on the speed at which a UE is moving, in accordance with certain aspects of the present disclosure.

In some cases, adjusting one or more parameters may include adjusting a frequency with which the UE can request information from one or more location information sources. FIG. 9 illustrates example operations 900 that may be performed to modify a frequency at which location information is requested, in accordance with some aspects of the present disclosure. Operations 900 may begin at 910, where the UE, e.g., measures or otherwise obtains the speed of the UE. At 920, the UE compares the speed of the UE to a high speed threshold. If the speed of the UE is below or equal to the high speed threshold, operations 900 proceed to 930, where the UE compares the speed of the UE to a low speed threshold. If the speed of the UE is less than the low speed threshold, it can be assumed that the UE is either stationary or substantially stationary (e.g., moving within a room or a building). Thus, operations proceed to 940, where the UE sets a location request frequency to a value corresponding to a stationary UE state. Because a UE is stationary or substantially stationary, the location of the UE is relatively constant, and the UE need not update and report location information frequently.

If the speed of the UE is less than or equal to the high speed threshold but greater than or equal to the low speed threshold, it can be assumed that the UE is moving at a low velocity. Thus, operations 900 proceed to 950, where the UE sets a location request frequency to a value corresponding to a low velocity UE. This value generally results in more frequent location information requests than when the UE is in an immobile or stationary state, but less frequent location information requests than when the UE is moving at a high velocity.

If the speed of the UE exceeds the high speed threshold, operations 900 proceed from 920 to 960, where the UE sets a location request frequency to a value corresponding to a high velocity UE. Because a UE may be changing location rapidly, location information updating and reporting may occur more frequently than when the UE is traveling at a low velocity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, frequencies, optical fields or particles, or any combination thereof.

Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, PCM (phase change memory), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    determining one or more properties of the UE, wherein the one or more properties include at least power state, last known location information, and a data usage threshold;
    selecting, based at least in part on the determined one or more properties of the UE, one or more location information devices of a plurality of location information devices of the UE to activate for determining a location of the UE, wherein selecting the one or more location information devices comprises selecting wireless wide area network (WWAN) data services to use for determining the location of the UE;
    identifying, based at least in part on the determined one or more properties of the UE, one or more parameters for determining the location of the UE, wherein identifying one or more parameters for determining the location of the UE comprises adjusting a number of times the UE can request location information using the WWAN data services based on the determined data usage threshold;
    determining the location of the UE based on data from the selected one or more location information devices, wherein the data is generated based, at least in part, on the one or more parameters; and
    reporting the determined location of the UE.

2. The method of claim 1, wherein the determining one or more properties of the UE comprises determining at least one of a battery level or charging state.

3. The method of claim 2, wherein:
    the determining at least one of a battery level or charging state comprises determining that the battery level exceeds a threshold value or determining that a battery is charging; and
    selecting the one or more location information devices comprises enabling a satellite positioning system (SPS) receiver.

4. The method of claim 1, wherein the determining one or more properties of the UE comprises determining a frequency of requests for location information.

5. The method of claim 1, wherein the determining one or more properties of the UE comprises determining the UE is currently at a previously known location.

6. The method of claim 1, wherein the one or more parameters comprises an acceptable level of location accuracy.

7. The method of claim 1, wherein the one or more parameters comprises a frequency with which the UE can request location information from the selected one or more location information devices.

8. The method of claim 1, wherein the one or more parameters comprises a maximum number of requests for location information the UE can make during a service period.

9. An apparatus for wireless communications by a user equipment (UE), comprising:
at least one processor configured to:
determine one or more properties of the UE, wherein the one or more properties include at least power state, last known location information, and a data usage threshold;
select, based at least in part on the determined one or more properties of the UE, one or more location information devices of a plurality of location information devices of the UE to activate for determining a location of the UE, wherein selecting the one or more location information devices comprises selecting wireless wide area network (WWAN) data services to use for determining the location of the UE;
identify, based at least in part on the determined one or more properties of the UE, one or more parameters for determining the location of the UE, wherein identifying one or more parameters for determining the location of the UE comprises adjusting a number of times the UE can request location information using the WWAN data services based on the determined data usage threshold;
determine the location of the UE based on data from the selected one or more location information devices, wherein the data is generated based, at least in part, on the one or more parameters; and
report the determined location of the UE; and
a memory coupled to the at least one processor.

10. The apparatus of claim 9, wherein the at least one processor is further configured to determine at least one of a battery level or charging state.

11. The apparatus of claim 10, wherein the at least one processor is further configured to:
determine that the battery level exceeds a threshold value or determining that a battery is charging; and
select the one or more location information devices by enabling a satellite positioning system (SPS) receiver.

12. The apparatus of claim 9, wherein the at least one processor is further configured to determine a frequency of requests for location information.

13. The apparatus of claim 9, wherein the at least one processor is further configured to determine the UE is currently at a previously known location.

14. The apparatus of claim 9, wherein the one or more parameters comprises an acceptable level of location accuracy.

15. The apparatus of claim 9, wherein the one or more parameters comprises a frequency with which the UE can request location information from the selected one or more location information devices.

16. The apparatus of claim 9, wherein the one or more parameters comprises a maximum number of requests for location information the UE can make during a service period.

17. An apparatus for wireless communications by a user equipment (UE), comprising:
means for determining one or more properties of the UE, wherein the one or more properties include at least power state, last known location information, and a data usage threshold;
means for selecting, based at least in part on the determined one or more properties of the UE, one or more location information devices of a plurality of location information devices of the UE to activate for determining a location of the UE, wherein the means for selecting the one or more location information devices comprises means for selecting wireless wide area network (WWAN) data services to use for determining the location of the UE;
means for identifying, based at least in part on the determined one or more properties of the UE, one or more parameters for determining the location of the UE, wherein the means for identifying one or more parameters for determining the location of the UE comprises means for adjusting a number of times the UE can request location information using the WWAN data services based on the determined data usage threshold;
means for determining the location of the UE based on data from the selected one or more location information devices, wherein the data is generated based, at least in part, on the one or more parameters; and
reporting the determined location of the UE.

18. The apparatus of claim 17, wherein the means for determining one or more properties of the UE comprises means for determining at least one of a battery level or charging state.

19. The apparatus of claim 18, wherein:
the means for determining at least one of a battery level or charging state comprises means for determining that the battery level exceeds a threshold value or determining that a battery is charging; and
the means for selecting one or more location information devices of a plurality of location information devices to activate for determining a location of the UE and one or more parameters for determining the location of the UE comprises means for enabling a satellite positioning system (SPS) receiver.

20. The apparatus of claim 17, wherein the means for determining one or more properties of the UE comprises means for determining a frequency of requests for location information.

21. The apparatus of claim 17, wherein the means for determining one or more properties of the UE comprises means for determining the UE is currently at a previously known location.

22. The apparatus of claim 17, wherein the means for identifying one or more parameters for determining the location of the UE comprises means for adjusting an acceptable level of location accuracy.

23. The apparatus of claim 17, wherein the means for identifying one or more parameters for determining the location of the UE comprises means for adjusting a frequency with which the UE can request location information from the selected one or more location information devices.

24. A non-transitory computer-readable medium for wireless communications by a user equipment (UE), comprising code which when executed by at least one processor, causes the UE to:

determine one or more properties of the UE, wherein the one or more properties include at least power state, last known location information, and a data usage threshold;

select, based at least in part on the determined one or more properties of the UE, one or more location information devices of a plurality of location information devices of the UE to activate for determining a location of the UE, wherein selecting the one or more location information devices comprises selecting wireless wide area network (WWAN) data services to use for determining the location of the UE;

identify, based at least in part on the determined one or more properties of the UE, one or more parameters for determining the location of the UE, wherein identifying one or more parameters for determining the location of the UE comprises adjusting a number of times the UE can request location information using the WWAN data services based on the determined data usage threshold;

determine the location of the UE based on data from the selected one or more location information devices, wherein the data is generated based, at least in part, on the one or more properties; and report the location of the UE.

* * * * *